United States Patent
Grandhi et al.

(10) Patent No.: US 8,830,846 B2
(45) Date of Patent: Sep. 9, 2014

(54) METHOD AND SYSTEM FOR IMPROVING RESPONSIVENESS IN EXCHANGING FRAMES IN A WIRELESS LOCAL AREA NETWORK

(75) Inventors: Sudheer A. Grandhi, Mamaroneck, NY (US); Arty Chandra, Manhasset Hills, NY (US); Eldad Zeira, Huntington, NY (US); Mohammed Sammour, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 588 days.

(21) Appl. No.: 11/393,303

(22) Filed: Mar. 29, 2006

(65) Prior Publication Data
US 2006/0248429 A1  Nov. 2, 2006

Related U.S. Application Data

(60) Provisional application No. 60/668,154, filed on Apr. 4, 2005, provisional application No. 60/670,858, filed on Apr. 13, 2005.

(51) Int. Cl.
| G01R 31/08 | (2006.01) |
| H04J 1/16 | (2006.01) |
| H04L 1/00 | (2006.01) |
| H04L 1/16 | (2006.01) |
| H04L 25/03 | (2006.01) |
| H04L 25/02 | (2006.01) |

(52) U.S. Cl.
CPC ............ H04L 1/1664 (2013.01); H04L 1/1671 (2013.01); H04L 1/1685 (2013.01); *H04L 2025/03426* (2013.01); *H04L 25/0204* (2013.01); *H04L 25/03343* (2013.01); *H04L 2025/03802* (2013.01); *H04L 25/0226* (2013.01)
USPC ............................. 370/252; 370/232; 370/235

(58) Field of Classification Search
CPC . H04L 1/1671; H04L 1/1685; H04L 25/0202; H04L 25/0224; H04L 25/0226; H04L 25/022
USPC .............. 370/230, 230.1, 232, 233, 234, 235, 370/252, 278, 282, 430
See application file for complete search history.

(56) References Cited

U.S. PATENT DOCUMENTS

| 5,491,723 A | 2/1996 | Diepstraten |
| 5,999,578 A | 12/1999 | Ha |

(Continued)

FOREIGN PATENT DOCUMENTS

| JP | 2001-231078 | 8/2001 |
| JP | 2003-163960 | 6/2003 |

(Continued)

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) specifications: Amendment: Medium Access Control (MAC) Quality of Service (QOS) Enhancements, IEEE P802.11e/D13.0 (Jan. 2005).

(Continued)

*Primary Examiner* — Wesley Kim
(74) *Attorney, Agent, or Firm* — Volpe and Koenig, P.C.

(57) ABSTRACT

A method and system for improving responsiveness in exchanging management and control frames in a wireless local area network are disclosed. An initiator sends a frame (action, management, control or data frame) to a responder. Upon correctly receiving the frame, the responder sends a response frame to the initiator instead of directly sending an acknowledgement (ACK) packet. The responder preferably accesses the wireless medium to send the response frame in a short inter-frame spacing (SIFS). With this scheme, a long delay associated with having to contend for the wireless medium to send the response frame is avoided and therefore, the responsiveness and timeliness of the feedback mechanism is significantly enhanced. The response frame may be piggybacked on or aggregated with another packet.

46 Claims, 5 Drawing Sheets

(56) References Cited

U.S. PATENT DOCUMENTS

| | | | |
|---|---|---|---|
| 6,351,500 | B2 | 2/2002 | Kumar |
| 6,473,467 | B1 | 10/2002 | Wallace et al. |
| 6,480,528 | B1 | 11/2002 | Patel et al. |
| 6,611,565 | B1 | 8/2003 | Bada et al. |
| 6,631,170 | B1 | 10/2003 | Gu |
| 6,795,418 | B2 | 9/2004 | Choi |
| 7,289,529 | B2 | 10/2007 | Sherman |
| 7,313,104 | B1* | 12/2007 | Kern et al. ............... 370/310 |
| 7,369,511 | B2 | 5/2008 | Utsunomiya et al. |
| 7,653,043 | B2 | 1/2010 | Sakoda |
| 2002/0089959 | A1 | 7/2002 | Fischer et al. |
| 2003/0140296 | A1 | 7/2003 | Odman |
| 2004/0072573 | A1 | 4/2004 | Shvodian |
| 2004/0085905 | A1* | 5/2004 | Lim et al. ............... 370/236.2 |
| 2005/0059422 | A1 | 3/2005 | Rudolf et al. |
| 2005/0068900 | A1* | 3/2005 | Stephens et al. ........... 370/252 |
| 2005/0089005 | A1* | 4/2005 | Sakoda et al. ............ 370/348 |
| 2005/0192011 | A1 | 9/2005 | Hong et al. |
| 2005/0204247 | A1* | 9/2005 | Guo et al. ................. 714/746 |
| 2005/0249244 | A1* | 11/2005 | McNamara et al. ........ 370/474 |
| 2005/0281243 | A1 | 12/2005 | Horn et al. |
| 2006/0034248 | A1* | 2/2006 | Mishra et al. ............. 370/349 |
| 2006/0056362 | A1* | 3/2006 | Jang et al. ................. 370/336 |
| 2006/0056443 | A1* | 3/2006 | Tao et al. .................. 370/462 |
| 2006/0140172 | A1* | 6/2006 | Trainin ..................... 370/352 |
| 2006/0187964 | A1* | 8/2006 | Li et al. .................... 370/474 |
| 2006/0203837 | A1* | 9/2006 | Shvodian .................. 370/445 |
| 2008/0287138 | A1* | 11/2008 | Yoon et al. ............... 455/452.2 |

FOREIGN PATENT DOCUMENTS

| | | |
|---|---|---|
| JP | 2003-258814 | 9/2003 |
| WO | 2004/114598 | 12/2004 |
| WO | 2005/006785 | 1/2005 |
| WO | 2005/015812 | 2/2005 |
| WO | 2005/029774 | 3/2005 |

OTHER PUBLICATIONS

Hillman, "Minutes of High Throughput Task Group .11n Meetings," IEEE P802.11 Wireless LANs (Sep. 2004).

IEEE P802.11n D1.0; Draft Amendment to Standard [FOR] Information Technology—Telecommunications and information exchange between systems—Local and Metropolitan networks—Specific requirements—Part 11: Wireless LAN Medium Access Control (MAC) and Physical Layer (PHY) specifications: Enhancements for Higher Througput, IEEE P802.11n/D1.0 (Mar. 2006).

IEEE Standard for Information technology—Telecommunications and information exchange between systems—Local and metropolitan area networks—Specific requirements, Part 11: Wireless LAN Medium Access Control (MAC) and Physical Layer (PHY) specifications: Amendment: Medium Access Control (MAC) Quality of Service (QoS) Enhancements, IEEE P802.11e/D13.0 (Jan. 2005).

Coffey, "WWiSE IEEE 802.11n Propsal," IEEE 802.11-05/150r1 (Mar. 2005).

Godfrey, "Inside 802.11e: Making QoS a Reality over WLAN Connection," http://www.eetimes.com/design/comunnications-design/4009268/Inside-802-11e-Making-Qos-a-Reality-over-WLAN-Connection, (Dec. 12, 2003).

Hillman, "Minutes of High Throughput Task Group .11n Meetings," IEEE P802.11 Wireless LANs, IEEE802.11-04/0983-01 (Sep. 2004).

IEEE P802.11n D1.0; Draft Amendment to Standard [FOR] Information Technology—Telecommunications and information exchange between systems—Local and Metropolitan networks—Specific requirements—Part 11: Wireless LAN Medium Access Control (MAC) and Physical Layer (PHY) specifications: Enhancements for Higher Throughput, IEEE P802.11n/D1.0 (Mar. 2006).

IEEE Standard for Information technology—Telecommunications and information exchange between systems—Local and metropolitan area networks—Specific requirements, Part 11: Wireless LAN Medium Access Control (MAC) and Physical Layer (PHY) specifications: Amendments: Medium Access Control (MAC) Quality of Service (QoS) Enhancements, IEEE P802.11e/D13.0 (Jan. 2005).

IEEE Standard for Information technology—Telecommunications and information exchange between systems—Local and metropolitan area networks—Specific Requirements; Part 15.3: Wireless Medium Access Control (MAC) and Physical Layer (PHY) Specifications for High Rate Wireless Personal Area Networks (WPANs), iEEE Std 802.15.3-2003 (Sep. 29, 2003).

Information Technology—Telecommunications and information exchange between systems—Local and metropolitan area networks—Specific requirements—Part 11: Wireless LAN Medium Access Control (MAC) and Physical Layer (PHY) Specifications, ANSI/IEEE Std 802.11, 1999 Edition (R2003) (Jun. 12, 2003).

Kerry et al., "Tentative Minutes of the IEEE P802.11 Full Working Group," IEEE P802.11 Wireless LANs, IEEE 802.11-04/1055r0 (Sep. 2004).

Kose et al., "IEEE P802.11 Wireless LANs, WWiSE Proposal: High throughput extension to the 802.11 Standard," IEEE 802.11-05/0149r1 (Jan. 6, 2005).

Liaw, "An Overview of 802.11e," http://netlab18.cis.nctu.edu.tw/html/wlan_course/seminar/An%20Overview%20of%20802_11e.pdf (Dec. 3, 2004).

Mujtaba, "IEEE P802.11 Wireless LANs, TGn Sync Proposal Technical Specification," IEEE 802.11-04/0889r44 (Mar. 2005).

Mujtaba, "IEEE P802.11 Wireless LANs, TGn Sync Proposal Technical Specification," IEEE 802.11-04/0889r7 (Jul. 2005).

Ransbottom, "Mobile Wireless System Interworking with 3G and Packet Aggregation for Wireless LAN," Virginia Polytechnic Institute (Apr. 22, 2004).

Qiao et al., "Energy-Efficient PCF Operation of IEEE 802.11a Wireless LAN," IEEE 21st Annual Joint Conference on Computer Communications, vol. 2, pp. 580-589 (Jun. 23-27, 2001).

Qiao et al., "Goodput Enhancement of IEEE 802.11a Wireless LAN via Link Adaptation," IEEE International Conference on Communications, vol. 7, pp. 1995-2000 (Jun. 11-14, 2001).

* cited by examiner

METHOD AND SYSTEM FOR IMPROVING RESPONSIVENESS IN EXCHANGING FRAMES IN A WIRELESS LOCAL AREA NETWORK

CROSS REFERENCE TO RELATED APPLICATIONS

This application claims the benefit of U.S. provisional application Nos. 60/668,154 filed Apr. 4, 2005 and 60/670,858 filed Apr. 13, 2005, which are incorporated by reference as if fully set forth.

FIELD OF INVENTION

The present invention is related to a wireless local area network (WLAN). More particularly, the present invention is related to a method and system for improving responsiveness in exchanging management, control or data frames in the WLAN.

BACKGROUND

In IEEE 802.11 WLANs, an access point (AP) or a station (STA) use management frames to conduct certain management functions. Examples of the management frames are Association Request, Association Response, Reassociation Request, Reassociation Response, Probe Request and Probe Response frames.

The IEEE 802.11e extends the IEEE 802.11 standards with new management frames. Some of those new management frames are called action frames. The action frames are used for conducting certain functions such as quality of service (QoS) traffic stream set-up, direct link set-up, block acknowledgment (ACK) set-up, or the like. Examples of the action frames include Add Traffic Stream (ADDTS) Request, ADDTS Response, Direct Link Setup (DLS) Request, DLS Response, Add Block acknowledgement (ACK) (ADDBA) Request, Add Block ACK Response, Delete Block ACK (DELBA) Request, or the like.

Currently, the IEEE 802.11n extension has been proposed for achieving higher throughput (HT). In the IEEE 802.11n proposal, new action frames are introduced for providing transmission mode and channel information feedback. Transmission mode feedback allows a receiving station to inform a transmitting station of the preferred mode for the current channel conditions. The particular choice of mode is determined by the receiving station. The transmitting station may or may not use the particular mode, depending on its capabilities. A receiving station may also decline to provide a preferred mode. Channel information feedback provides a mechanism for a transmitting station to learn the precise channel seen at the receiving station. This information may either be used as part of a calibration, for systems that assume channel reciprocity, or as direct channel feedback. A receiving station may either provide a complete channel estimate or a null response. Examples of the IEEE 802.11n action frames are Mode Request, Mode Response, multiple-input multiple-output (MIMO) Channel Request and MIMO Channel Response frames.

Management frames, (including action frames), may be broadcast or multicast to multiple responders, (e.g., via a beacon frame), or alternatively may be unicast to a specific (single) responder, (e.g., ADDBA Request, ADDBA Response, Mode Request, Mode Response, MIMO Channel Request and MIMO Channel Response). When a management or action frame is unicast to a specific responder, the IEEE 802.11 standard requires the responder to acknowledge the receipt of such frame by sending an ACK packet. On the other hand, if the management or action frame is broadcast or multicast to multiple responders, the IEEE 802.11 standard does not require the responders to acknowledge the receipt of such frame.

Figure 1:
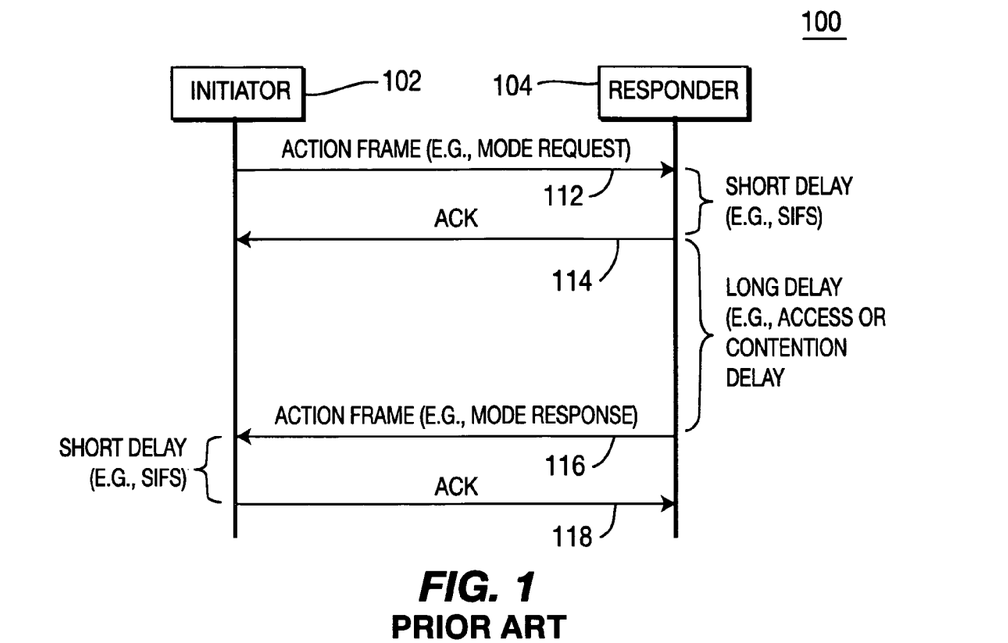
FIG. 1 is a prior art signaling diagram for exchanging management or action frames between an initiator and a responder.

FIG. 1 is a signaling diagram of a prior art process 100 for exchanging management or action frames between an initiator 102 and a responder 104. The initiator 102 accesses the wireless medium, which needs some delay corresponding to the contention or access delay under the IEEE 802.11 standards, and sends an action frame, (e.g., a Mode Request frame), to the responder 104 (step 112). Upon correctly receiving the action frame, the responder 104 access the wireless medium, which also needs some delay, (e.g., a delay corresponding to a short inter-frame spacing (SIFS)), and sends an ACK packet to the initiator 102 (step 114). The responder 104 then prepares an action frame, (e.g., a Mode Response frame), including the data requested by the initiator 102 and then accesses the wireless medium again, which needs some delay due to contention or access delay, and sends the action frame to the initiator 102 (step 116). This time, the delay may be substantially long because it is possible that other stations may exchange packet at that time and therefore the responder 104 may not be able to access the medium as it wants to. Upon correctly receiving the action frame from the responder 104, the initiator 102 accesses the wireless medium, which also needs some delay, (typically a time period corresponding to the SIFS), and sends an ACK packet to the responder 104 (step 118).

In the prior art process 100, since the responder 104 has to first send an ACK packet (step 114) and then has to incur a contention or access delay in order to access the wireless medium to send the response frame at step 116, the responsiveness for exchanging such management or action frames is relatively slow. Such slow management or action frame response may degrade the performance of the WLAN since the information may not be valid or relevant at the time it is delivered. For example, since transmission mode feedback allows the responder 104 to specify or indicate to the initiator transmission-related information including a data rate, a modulation and coding scheme (MCS), the number of spatial streams in MIMO and the guard interval, such information should be exchanged as quickly as possible. However, under the prior art scheme, the exchange of such information may be substantially delayed.

Therefore, a new mechanism to exchange the management or action frames in a very short period of time is desirable.

SUMMARY

The present invention is related to a method and system for improving responsiveness in exchanging management and control frames in a WLAN. An initiator sends a frame, (action, management, control or data frame), to a responder. Upon correctly receiving the frame, the responder sends a response frame to the initiator instead of directly sending an ACK packet. The responder preferably accesses the wireless medium to send the response in an SIFS. With this scheme, a long delay associated with having to contend for the wireless medium to send the response frame is avoided and therefore, the responsiveness and timeliness of the feedback mechanism is significantly enhanced. The response frame may be piggybacked on or aggregated with another packet.

DETAILED DESCRIPTION OF THE PREFERRED EMBODIMENTS

Hereafter, the terminology "initiator" and "responder" include but is not limited to a user equipment (UE), a wireless transmit/receive unit (WTRU), a mobile station, a fixed or mobile subscriber unit, a pager, a Node-B, a base station, a site controller, an access point or any other type of device capable of operating in a wireless environment.

The features of the present invention may be incorporated into an integrated circuit (IC) or be configured in a circuit comprising a multitude of interconnecting components.

Figure 2:
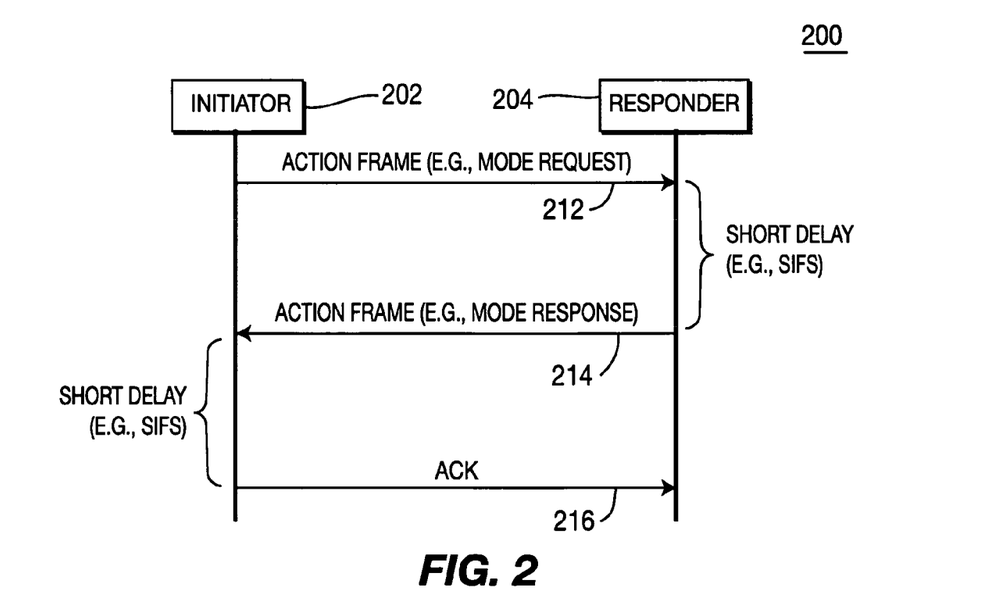
FIG. 2 is a signaling diagram for exchanging management or action frames between an initiator and a responder in accordance with the present invention.

FIG. 2 is a signaling diagram of a process 200 for exchanging action frames between an initiator 202, (also known as originator), and a responder 204, (also known as recipient), in accordance with the present invention. The initiator 202 is a communication entity that holds a transmit opportunity (TXOP) and transmits a first frame in a frame exchange sequence including aggregate physical layer protocol data units (A-PPDUs) or aggregated control frames. The responder 204 is a communication entity that responds to the initiator 202 in a frame exchange sequence including A-PPDUs and aggregated control frames. The initiator 202 sends an action frame, (usually a request frame such as a Mode Request frame), to a responder 204 (step 212). Upon correctly receiving the action frame, instead of directly sending an ACK packet, the responder 204 sends a responsive action frame, (e.g., a Mode Response frame) (step 214). Hereinafter, the present invention will be described with reference to action frames. However, it should be noted that the present invention is equally applicable to any types of frames, such as management frames, control frames, data frames or the like. The request frame and the response frame may be different types of frames.

The responder 204 preferably accesses the wireless medium to send the response action frame in a time period corresponding to an SIFS. The initiator 202 then sends an ACK frame after a short delay preferably corresponding to the SIFS (step 216). In accordance with the present invention, the long delay associated with having to contend for the wireless medium at step 116 in FIG. 1 is avoided and therefore, the responsiveness and timeliness of the feedback mechanism is significantly enhanced.

Alternatively, the response action frame at step 214 may be piggybacked on an ACK packet, another management or control frame, or a data packet, or may be aggregated with the ACK packet, another management or control frame, or a data packet. When the ACK packet is piggybacked or aggregated, the ACK packet which is sent in response to the initial action frame, (i.e., the Mode Request frame), is not eliminated, but sent together with another frame.

The signaling mechanism of the present invention may be implemented by default, or in accordance with an established procedure common to both the initiator 202 and the responder 204. In this case, additional fields are included in an action frame, (including a management frame, a control frame, a data frame, or the like), to indicate a preferred signaling mechanism. For example, the initiator 202 may send a request frame, (e.g., a mode request frame, a MIMO channel request frame, an MCS request (MRQ) frame, a channel state information (CSI) request frame, a calibration start frame, a transmit antenna selection sounding request frame, or a training request (TRQ) frame, or the like), setting the new fields in the request frame indicating how the responder 204 is expected to respond to the request frame.

The new fields include, but are not limited to, at least one of an ACK policy field, a request identity number field, a response time policy field and an aggregation policy field. The ACK policy field indicates whether the responder 204 needs to send an ACK packet or not.

The request identity number field includes a request identity number. A response frame uses a similar request identity number field whose value corresponds to the request identity number in the request frame. Alternatively, the request identity number field in the response frame may be set to a special value if the response frame is sent as often as possible, which will be explained in detail hereinafter.

The response time policy field indicates whether the responder 204 is expected to send a response frame to the initiator 202 immediately, (i.e., SIFS), or within a specified time period which is longer than the short delay, or at times that the responder 204 chooses, (i.e., unsolicited).

The aggregation policy field indicates whether the responder 204 is expected to send the response frame piggybacked on another packet, or aggregated with other packets, such as an ACK packet, a management or control packet, a data packet or any other type of packet. Multiple management frames may be aggregated within a packet. When an MMPDU is sent stand-alone, (i.e., not part of an aggregate), a simple ACK is used and when one or more MMPDUs are sent as part of an aggregate, a block ACK (BA) may be used.

When the ACK policy is chosen to include an ACK to the response frame, the following schemes may be applied. MMPDUs are assigned sequence numbers (SNs) by the initiator 202 using a single counter, which is not unique per responder, and are also used for broadcast/multicast frames and for non-QoS-data subtype frames. In accordance with the present invention, management frames may be sequenced using a new separate SN counter that is unique per responder. Alternatively, management frames may be sequenced using the same SN counter as that of the data that management frames are aggregated with. Another alternative is that the same IEEE 802.11e method of assigning SNs to management frames are used and the responder 204 may not reorder management frames, since gaps in the received SNs cannot be used to unambiguously identify missing frames by this responder 204. The initiator 202 is only required to store copies of those management frames for which it specified in the ACK policy field, until they are acknowledged or their lifetime expires.

With respect to a block ACK request (BAR) for management frames, the ACK policy field of the new MMPDU may be interpreted as a BAR. Alternatively, a separate BAR MAC protocol data unit (MPDU) for management frames may be sent as a part of an aggregate, (i.e., the aggregate contains 2 BAR frames: one for data frame and the other for management frame). Alternatively, the original BAR MPDU format may be extended to include an additional portion for management frames, (i.e., the aggregate contains one BAR frame with 2 portions for the management frame and data frame, respectively).

With respect to a BA packet, a separate BA MPDU for management frames may be sent as part of an aggregate, (i.e., the aggregate contains 2 BA packets: one for data frame and the other for management frame). Alternatively, a conventional BA MPDU format may be extended to include an additional portion to acknowledge management frames, (i.e., the aggregate contains 1 BA with 2 portions for the management frame and data frame, respectively).

With respect to the format of the BA and BAR packets that support management frames, the BA and BAR packets used for management frames may be made same or similar to the conventional format and may be explicitly identified using a bit or special field assignment. The BA and BAR may use the concept of a starting sequence number (SSN) followed by a bitmap. If a bit position n of the BA bitmap is set to 1, it acknowledges receipt of an MPDU having a sequence control value equal to BA SSN+n. If a bit position n of the BA bitmap is set to 0, it indicates that an MPDU with MPDU sequence control value equal to (BA SSN+n) has not been successfully received. Typically, the aggregated management frames are likely to have incremental SNs. In the case when the aggregated management frames have a large gap in SNs, (e.g., aggregating retransmitted frames and new frames), multiple BAs can be used (aggregated) each one acknowledging a different management frame or frames. For example, if the bitmap has a predefined maximum size, (e.g., 16 bits), and the aggregated management frames have sequence numbers that are different by more than 15, they cannot be acknowledged in the same bitmap and another BA frame is necessary. The BA and BAR may simply list the SN for each concerned management frame.

MRQ frames, MCS feedback (MFB) frames and Training Request (TRQ) frames, including the new fields, are described as examples herein. However, it should be noted that any other management, control or data frames may include these new fields to enhance responsiveness of exchanging the packets.

The MRQ frame is a management frame of category HT. The MRQ frame is used to request MCS feedback from a responder 204. The MRQ frame includes one or more of an ACK policy field, a request identity number field, a response time policy field and an aggregation format field in addition to an MCS request field, as shown in Table 1. The ACK policy field is set to either "No-ACK", (i.e., asking a direct MFB frame response), or "ACK", (i.e., asking an ACK packet). The request identity number field is set to either a request identity number if the MFB packet is expected to be one time or '0' if the MFB packet is to be sent as often as possible. The response time policy field is set to "immediate", (i.e., SIFS), "delayed" or "unsolicited". If the response time policy is set to "immediate", the responder 204 is expected to send an MFB frame immediately, (i.e., within SIFS). If the response time policy is set to "delayed", the responder 204 is expected to send the MFB frame in the specified delayed time. If the response time policy is set to "unsolicited", the responder 204 may send the response at times that the responder 204 chooses. The aggregation format field may be set to "aggregated MAC protocol data unit" (A-MPDU), "RIFS-PPDU" or "No-Aggregation." If the aggregation format field is set to "A-MPDU", the responder 204 and the initiator 202 are expected to send an A-MPDU. If the aggregation format field is set to "RIFS-PPDU", the responder 204 and the initiator 202 are expected to send multiple MPDUs using RIFS but may generate an A-MPDU. If the aggregation format field is set to No-Aggregation, the responder 204 and the initiator 202 are expected not to aggregate the MFB frame. As an alternative, if the aggregation format field is not included in the MRQ frame or the MFB frame, the aggregation may be performed as the responder 204 or initiator 202 decides on its own without having to be instructed by the other party via this aggregation format field. The MCS request indicates the type of feedback requested.

TABLE 1

| Body Field Order | Frame Body Field Information for MCS Request frame |
|---|---|
| 1 | ACK policy |
| 2 | Request identity number |
| 3 | Response time policy |
| 4 | Aggregation format |
| 5 | MCS request |

The MFB frame is a management frame of category HT. The MFB frame is sent either in response to an MRQ frame or independently. The MFB frame includes one or more of an ACK policy field, a request identity number field, a response time policy field and an aggregation format field in addition to an MFB field, as shown in Table 2. The ACK policy field is set to either "No-ACK" or "ACK." The request identity number field is set to corresponding request number from the MRQ frame if solicited or set to '0' if the MFB frame is sent as often as possible or unsolicited. The response time policy field is set to "immediate" (i.e., SIFS), "delayed" or "unsolicited." The aggregation format field may be set to "A-MPDU", "RIFS-PPDU" or "No-Aggregation." The operation of the ACK policy field, the request identity number field, the response time policy field and the aggregation format field is same to that of MRQ frame and will not be repeated herein for simplicity. The MCS feedback field includes MCS response.

TABLE 2

| Body Field Order | Frame Body Field Information for MCS Feedback frame |
|---|---|
| 1 | ACK policy |
| 2 | Request identity number |
| 3 | Response time policy |
| 4 | Aggregation format |
| 5 | MCS feedback |

The TRQ frame is a management frame of category HT. The TRQ frame requires the next transmission by the responder 204 to be a sounding PPDU with specified physical layer attributes. The TRQ frame includes one or more of an ACK policy field, a request identity number field, a response time policy field and an aggregation format field in addition to a channel sounding parameters field, as shown in Table 3. The ACK policy field is set to either "No-ACK" or "ACK." The request identity number field is set to a request number based on training procedure. The response time policy field is set to "immediate" (SIFS), "delayed" or "unsolicited." The aggregation format field is set to "A-MPDU", "RIFS-PPDU" or "No-Aggregation." The operation of the ACK policy field, the request identity number field, the response time policy field and the aggregation format field is same to that of MRQ frame and will not be repeated herein for simplicity. The channel sounding parameters field indicates the number and type of HT-long training fields (LTFs), the number of transmit and receive antennas, or the like.

TABLE 3

| Field Order | Frame Body Field Information for Training Request (TRQ) frame |
|---|---|
| 1 | ACK policy |
| 2 | Request identity number |
| 3 | Response time policy |
| 4 | Aggregation format |
| 5 | Channel sounding parameters |

The new fields, (i.e., one or more of an ACK policy field, a request identity number field, a response time policy field and an aggregation format field) may be included in any type of frames, such as a mode request frame, a mode response frame, a MIMO channel frame, a MIMO channel response frame, a CSI feedback request frame, a CSI feedback response frame, a calibration start frame, a calibration sounding response frame, a transmit antenna selection sounding request frame, an antenna selection feedback frame, or the like).

The mode request frame and the mode response frame are used for exchanging the best transmission mode to employ for high throughput communication. The MIMO channel request frame, the MIMO channel response frame, the CSI feedback request frame and the CSI feedback response frame are used for exchanging CSI between the initiator 202 and the responder 204. The calibration start frame and the calibration sounding response frame are used for calibration purposes to remove differences in transmit and receive chains in the initiator 202 and the responder 204. The transmit antenna selection sounding request frame and the antenna selection feedback frame are used for antenna selection by the initiator 202 or the responder 204.

Figure 3:
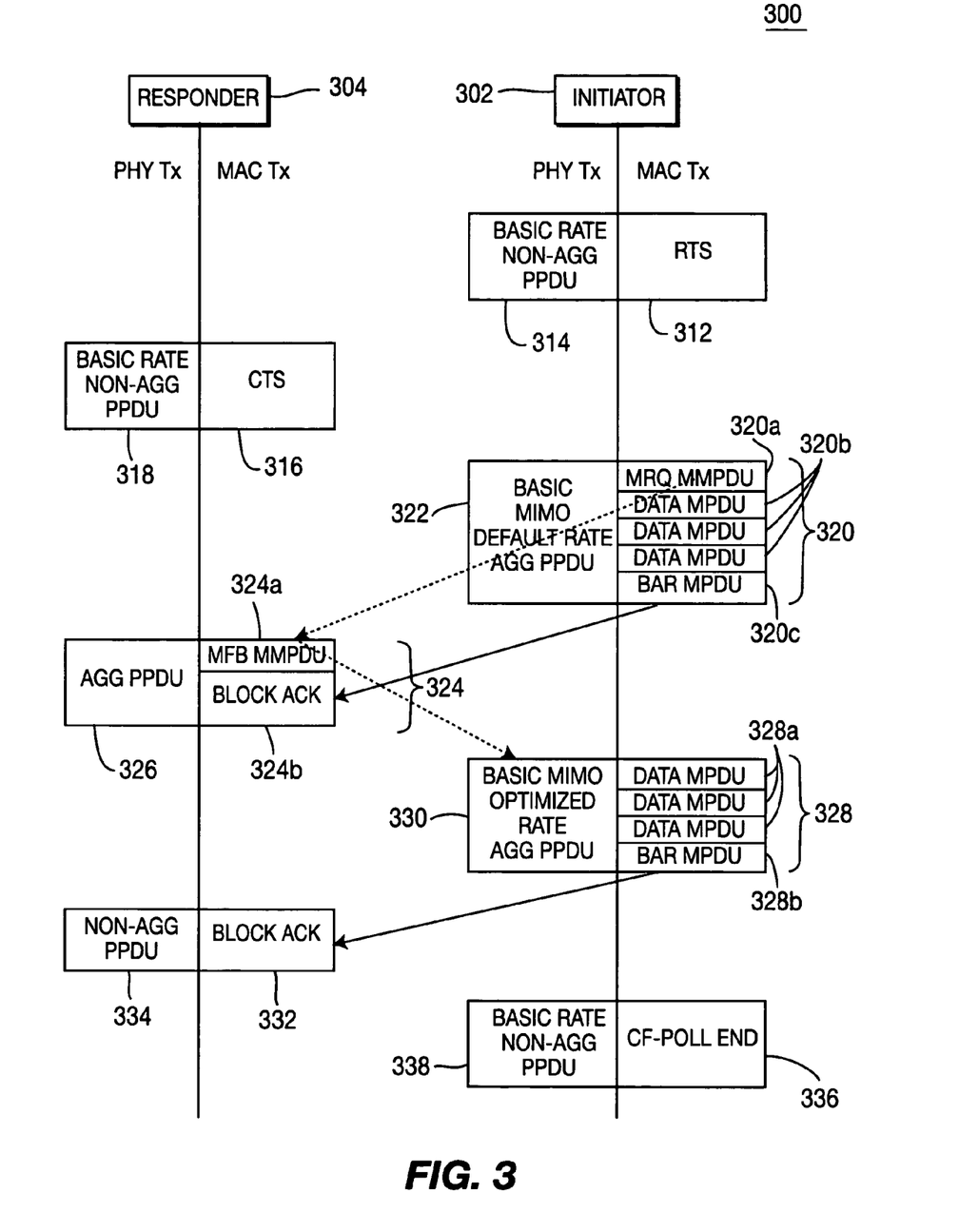
FIGS. 3 and 4 show exemplary processes for exchanging packets between an initiator and a responder using an aggregated medium access control (MAC) layer protocol data unit (A-MPDU) with an ACK policy specified as No-ACK for management MAC layer protocol data unit (MMPDUs) in accordance with the present invention.

FIG. 3 shows an exemplary process 300 for exchanging packets between an initiator 302 and a responder 304 using an A-MPDU with an ACK policy specified as No-ACK for MMPDUs in accordance with the present invention. The initiator 302 generates a request-to-send (RTS) frame 312 when there is a data to be sent to the responder 304 and sends the RTS frame 312 to the responder 304 using a basic rate non-aggregated PPDU 314. Upon receipt of the RTS frame 312, the responder 304 sends a clear-to-send (CTS) frame 316 to the initiator 302 using a basic rate non-aggregated PPDU 318. After receiving the CTS frame 316, the initiator 302 generates an A-MPDU 320 including an MRQ MMPDU 320a, data MPDUs 320b and a BAR MPDU 320c. The A-MPDU 320 is sent using an aggregated PPDU (A-PPDU) 322, which is generated based on basic MIMO and default MCS.

Since the ACK policy field of the MRQ MMPDU 320a is set to No-ACK, the responder 304 directly sends an MFB MMPDU 314a without sending an ACK to acknowledge receipt of the MRQ MMPDU 320a. The responder 304 generates an A-MPDU 324 including the MFB MMPDU 324a and a BA 324b to acknowledge receipt of the data MPDUs 320b and sends the A-MPDU 324 using an A-PPDU 326.

The initiator 302 receives the MFB MMPDU 324a and selects an optimized MCS in accordance with the MCS feedback included in the MFB MMPDU 324a. The initiator 302 generates another A-MPDU 328 including data MPDUs 328a and a BAR MPDU 328b and sends it using an A-PPDU 330 whose rate is optimized based on the MCS feedback. The responder 304 then sends a BA 332 in response to the BAR MPDU 328b using a non-aggregated PPDU 334. After successful transmission of the data, the initiator 302 then sends a CF-Poll END frame 336 to release the TXOP using a basic rate non-aggregated PPDU 338.

Figure 4:
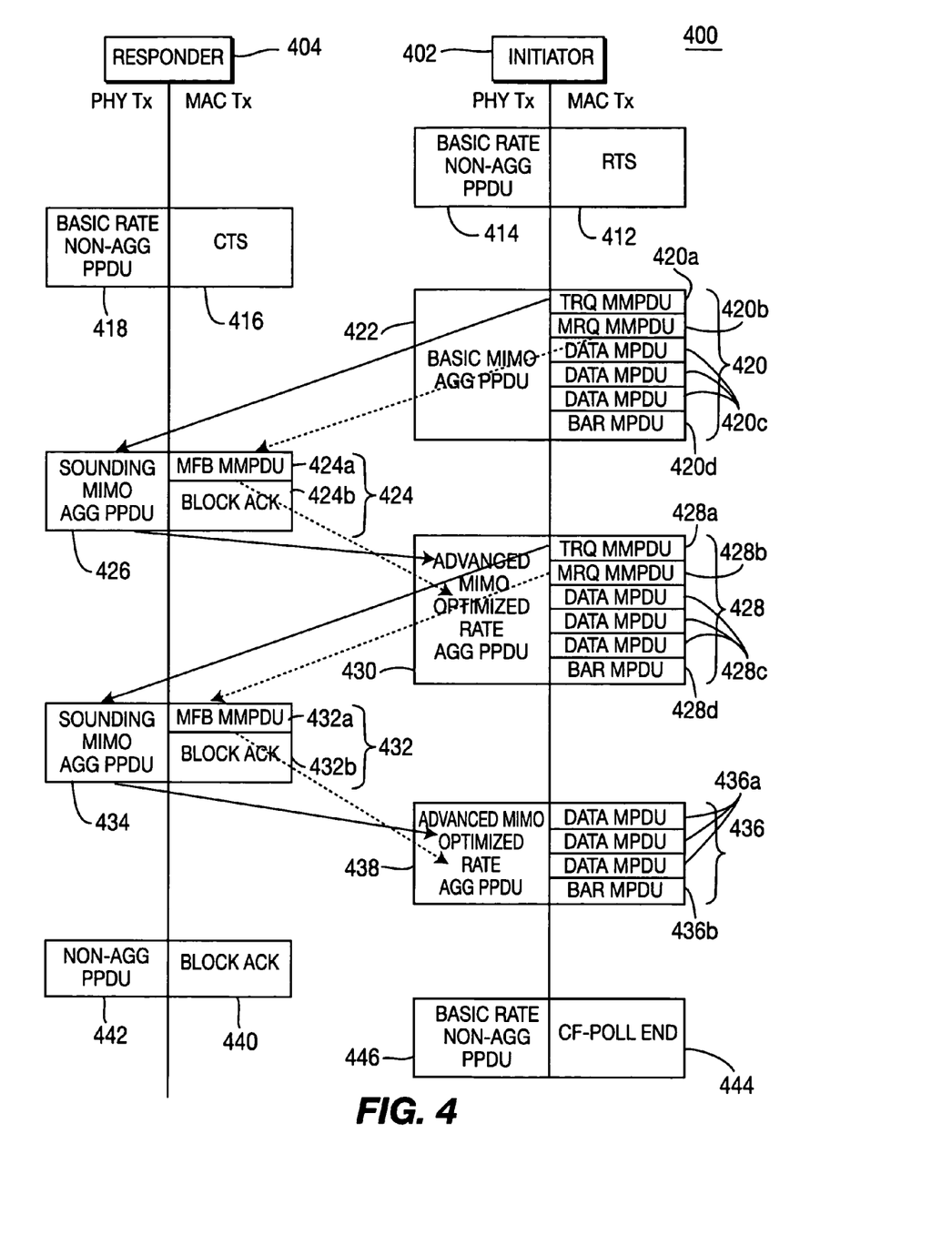

FIG. 4 shows another exemplary process 400 for exchanging packets between an initiator 402 and a responder 404 using an A-MPDU with an ACK policy specified as No-ACK for MMPDUs in accordance with the present invention. The initiator 402 generates an RTS frame 412 when there is a data to be sent to the responder 404 and sends the RTS frame 412 to the responder 404 using a basic rate non-aggregated PPDU 414. Upon receipt of the RTS frame 412, the responder 404 sends a CTS frame 416 to the initiator 402 using a basic rate non-aggregated PPDU 418. After receiving the CTS frame 416, the initiator 402 generates an A-MPDU 420 including a TRQ MMPDU 420a, an MRQ MMPDU 420b, data MPDUs 420c and a BAR MPDU 420d. The A-MPDU 420 is sent using an aggregated PPDU 422, which is generated based on a basic MIMO and default MCS.

Since the ACK policy fields of the TRQ MMPDU 420a and the MRQ MMPDU 420b are set to No-ACK, the responder 404 directly sends an MFB MMPDU 424a without sending a separate ACK to acknowledge receipt of the MRQ MMPDU 420b. The responder 404 generates an A-MPDU 424 including the MFB MMPDU 424a and a BA 424b and sends it using a sounding A-PPDU 426 as requested by the TRQ MMPDU 420a.

The initiator 402 then receives the sounding PPDU 426 and estimates channel state information (CSI) based on the sounding PPDU 426. The estimated CSI is used for setting MIMO parameters in transmission of next packet. The initiator 402 also receives the MFB MMPDU 424a and selects an optimized MCS in accordance with an MFB frame included in the MFB MMPDU 424a. The initiator 402 generates another A-MPDU 428 including a TRQ MMPDU 428a, an MRQ MMPDU 428b, data MPDUs 428c and a BAR MPDU 428d and sends the A-MPDU 428 using an A-PPDU 430. The A-PPDU 430 is generated based on MIMO parameters and MCS optimized in accordance with the CSI and the MFB. The responder 404 receives the A-MPDU 428 and generates another A-MPDU 432 including an MFB MMPDU 432a and a BA 432b and sends it using another sounding PPDU 434. The initiator 402 receives the sounding A-PPDU 434, estimates CSI and selects an MCS based on the MFB. The initiator 402 generates another A-MPDU 436 including data MPDUs 436a and a BAR MPDU 436b and sends it using an A-PPDU 438. The A-PPDU is generated based on MIMO parameters and MCS that are updated in accordance with the second CSI and the MFB. The responder 404 then sends a BA 440 in response to the BAR MPDU 436b using a non-aggregated PPDU 442. After successful transmission of the data, the initiator 402 sends a CF-Poll END frame 444 to release the TXOP using a basic rate, non-aggregated PPDU 446.

Figure 5:
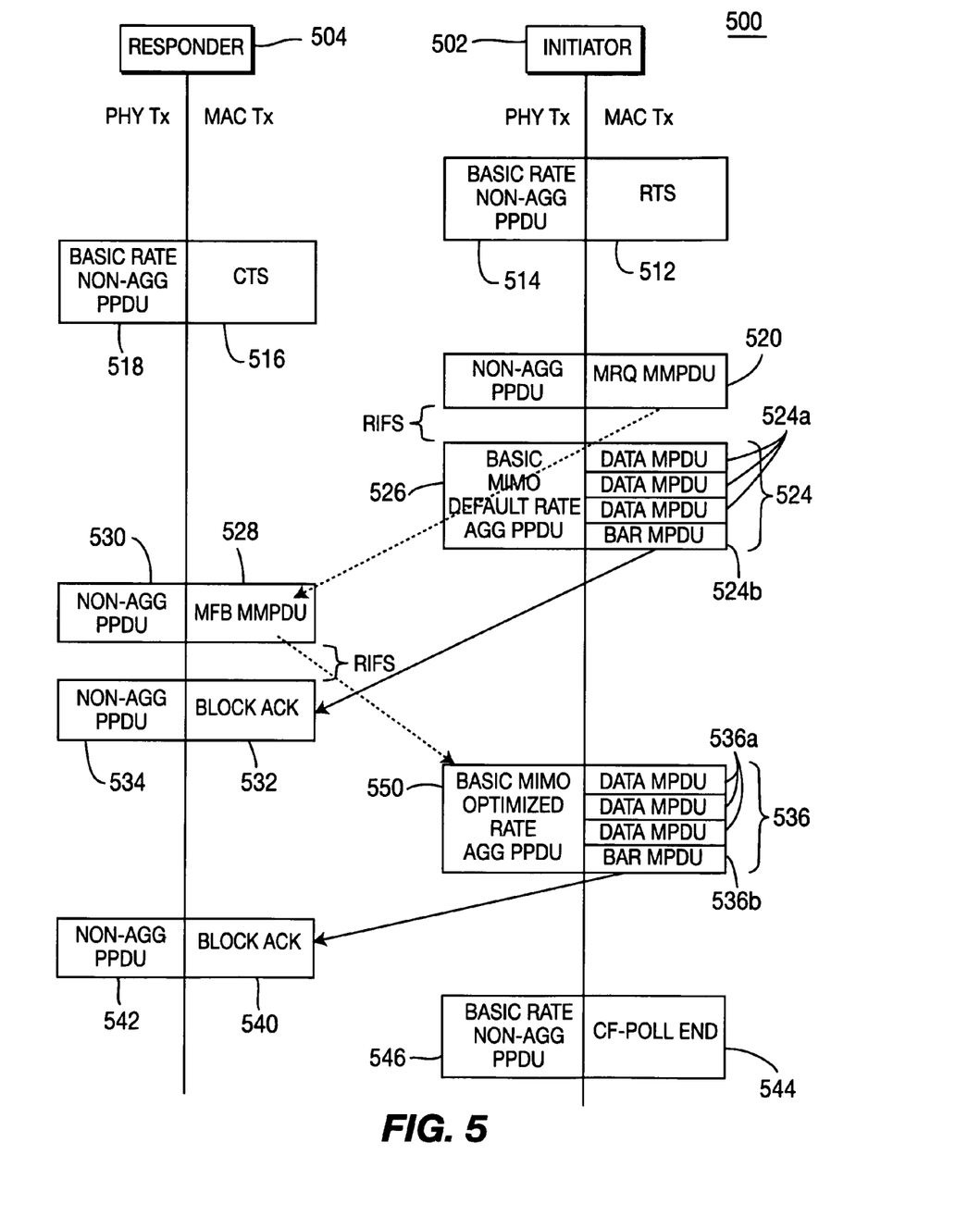
FIGS. 5 and 6 show exemplary processes for exchanging packets between an initiator and a responder using a reduced inter-frame spacing (RIFS) with an ACK policy specified as No-ACK for the MMPDUs in accordance with the present invention.

FIG. 5 shows an exemplary process 500 for exchanging packets between an initiator 502 and a responder 504 using an RIFS with an ACK policy specified as No-ACK for the MMPDUs in accordance with the present invention. The initiator 502 generates an RTS frame 512 when there is a data to be sent to the responder 504 and sends the RTS frame 512 to the responder 504 using a basic rate non-aggregated PPDU 514. Upon receipt of the RTS frame 512, the responder 504 sends a CTS frame 516 to the initiator 502 using a basic rate non-aggregated PPDU 518. After receiving the CTS frame 516, the initiator 502 generates an MRQ MMPDU 520 and sends the MRQ MMPDU 520 using a basic rate non-aggregated PPDU 522. Without releasing the TXOP, the initiator 502 also generates an A-MPDU 524 including data MPDUs 524a and a BAR MPDU 524b and sends the A-MPDU 524 after RIFS from the transmission of the PPDU 522 using an A-PPDU 526, which is generated based on a basic MIMO and default MCS.

After receiving the MRQ MMPDU 520, the responder 504 directly sends the MFB MMPDU 528 without sending an ACK since the ACK policy field of the MRQ MMPDU 520 is set to No-ACK. Without releasing the TXOP, the responder 504 generates a BA frame 532 to acknowledge receipt of the data MPDUs 524a and sends the BA 532 after RIFS from the transmission of the PPDU 530 using a non-aggregated PPDU 534.

The initiator 502 receives the MFB MMPDU 528 and selects an optimized MCS in accordance with an MFB included in the MFB MMPDU 528. The initiator 502 generates a second A-MPDU 536 including data MPDUs 536a and a BAR MPDU 536b and sends the second A-MPDU 536 using an A-PPDU 538, which is generated based on basic MIMO parameters and MCS optimized in accordance with the MFB. The responder 504 then sends a BA 540 to acknowledge receipt of the data MPDUs 536a using a non-aggregated PPDU 542. After successful transmission of the data, the initiator 504 sends a CF-Poll END frame to release TXOP using a basic rate, non-aggregated PPDU 546.

Figure 6:
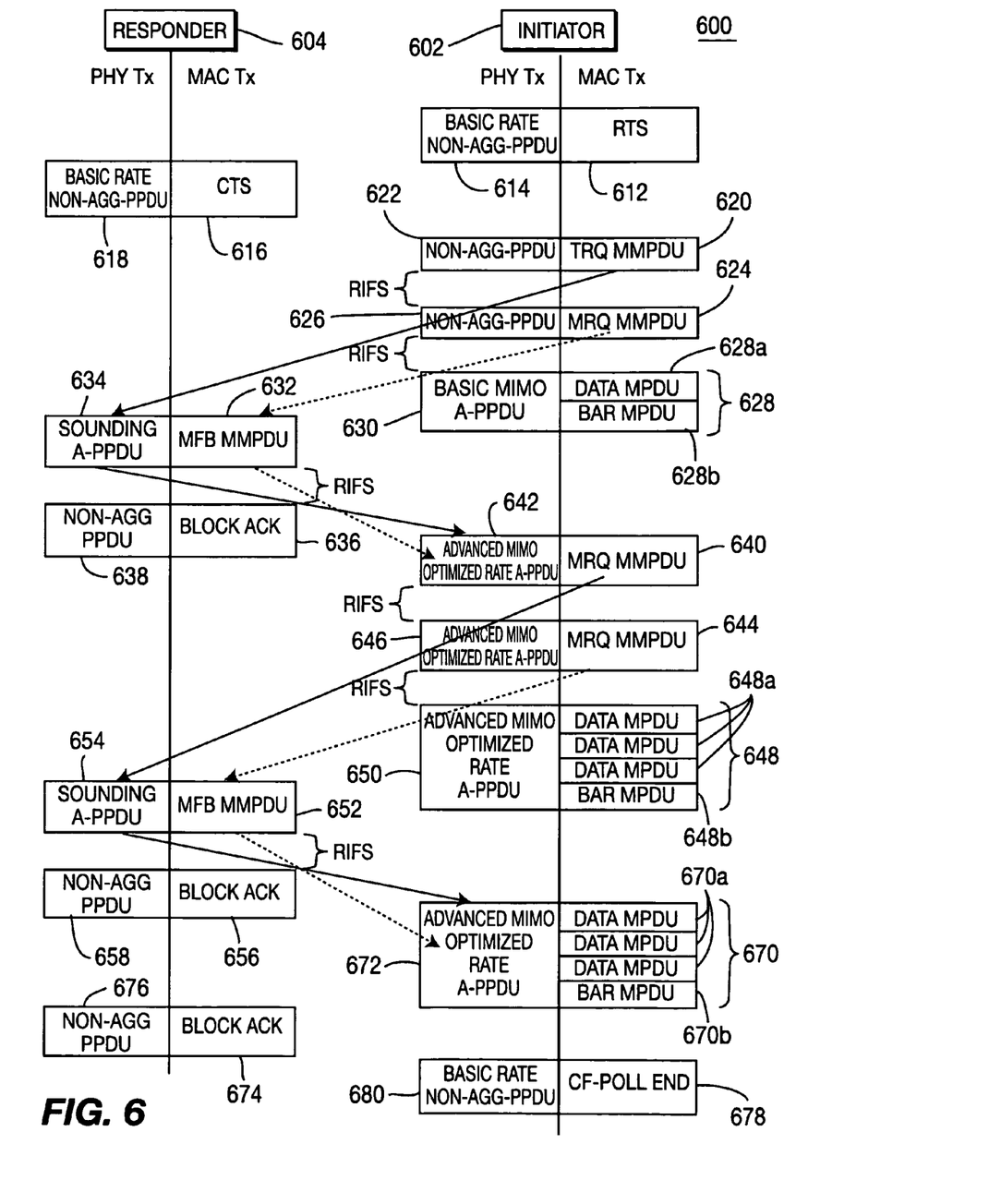

FIG. 6 shows another exemplary process 600 for exchanging packets between an initiator 602 and a responder 604 using an RIFS with an ACK policy specified as No-ACK for the MMPDUs in accordance with the present invention. The initiator 602 generates an RTS frame 612 when there is a data to be sent to the responder 604 and sends the RTS frame 612 to the responder 604 using a basic rate non-aggregated PPDU 614. Upon receipt of the RTS frame 612, the responder 604 sends a CTS frame 616 to the initiator 602 using a basic rate non-aggregated PPDU 618. After receiving the CTS frame 616, the initiator 602 generates a TRQ MMPDU 620 and sends the TRQ MMPDU 620 using a non-aggregated PPDU 622. In the same TXOP, the initiator 602 also generates a MRQ MMPDU 624 and sends the MRQ MMPDU 624 after RIFS from the transmission of the PPDU 622 using a non-aggregated PPDU 626. Also in the same TXOP, the initiator 602 generates an A-MPDU 628 including a data MPDU 628a and a BAR MPDU 628b and sends the A-MPDU 628 using an A-PPDU 630. The A-PPDU 630 is generated based on basic MIMO parameters and a default MCS.

The responder 604 receives the TRQ MMPDU 620 and the MRQ MMPDU 624 and generates a MFB MMPDU 632 and sends it via a sounding A-PPDU 634 as requested by the TRQ MMPDU 620. Since the ACK policy fields of the TRQ MMPDU 620 and the MRQ MMPDU 624 are set to No-ACK, the responder 604 directly sends an MFB MMPDU 632 without sending a separate ACK to acknowledge receipt of the TRQ MMPDU 620 and the MRQ MMPDU 624.

In the same TXOP, the responder 604 also generates a BA 636 to acknowledge receipt of the data MPDU 628a and sends the BA 636 after RIFS from the transmission of the PPDU 634 using a non-aggregated PPDU 638.

The initiator 602 then receives the sounding PPDU 634 and estimates CSI based on the sounding PPDU 634. The estimated CSI is used for setting MIMO parameters in transmission of next packet. The initiator 602 also receives the MFB MMPDU 632 and selects an optimized MCS in accordance with the MFB included in the MFB MMPDU 632.

The initiator 602 generates a second TRQ MMPDU 640 and sends it via an A-PPDU 642. In the same TXOP, the initiator 602 also generates a second MRQ MMPDU 644 and sends it after RIFS from the transmission of the A-PPDU 642 using an A-PPDU 646. Also in the same TXOP, the initiator 602 generates an A-MPDU 648 including data MPDUs 648a and a BAR MPDU 618b and sends the A-MPDU 648 after RIFS from transmission of the PPDU 646 using an A-PPDU 650. The A-PPDUs 642, 646, 650 are generated based on MIMO parameters and an MCS optimized in accordance with the CSI and the MFB.

The responder 604 receives the second TRQ MMPDU 640 and the second MRQ MMPDU 644 and generates a second MFB MMPDU 652 and sends the MFB MMPDU 652 using a second sounding A-PPDU 654. In the same TXOP, the responder 604 also generates a BA 656 to acknowledge receipt of the data MPDUs 648a and sends the BA 656 using a non-aggregated PPDU 658.

After receiving the second sounding A-PPDU 654 including the second MFB MMPDU 652, the initiator 602 estimates CSI and selects an MCS based on the new MFB included in the MFB MMPDU 652. The initiator 602 generates a third A-MPDU 670 including data MPDUs 670a and a BAR MPDU 670b and sends the third A-MPDU 670 using an A-PPDU 672, which is generated based on MIMO parameters and an MCS optimized in accordance with the updated CSI and MFB.

The responder 604 receives the A-MPDU 670 and sends a BA 674 to acknowledge receipt of the data MPDUs 670a using a non-aggregated PPDU 676. After successful transmission of the data, the initiator 602 then sends a CF-Poll END frame 678 to release the TXOP using a basic rate, non-aggregated PPDU 680.

In accordance with another embodiment of the present invention, the action, management or control frames may be prioritized over data frames. Such prioritization may be achieved explicitly through a designated field in the action, management or control frame, or implicitly via a hardware or software implementation that treats action, management or control frames with a higher priority when it comes to accessing the wireless medium. Such prioritization scheme is applicable to all action, management or control frames that are proposed by TGnSync or by WWiSE particularly to those action and management frames used for transmission mode feedback and channel feedback, (e.g., Mode Request, Mode Response, MIMO Channel Request and MIMO Channel Response, MRQ, TRQ frames).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in a first station (STA), the method comprising:
   transmitting, to a responder, a request frame, wherein the request frame includes a request identity number field that indicates a request identity number; and
   receiving, from the responder, a sounding physical layer protocol data unit (PPDU) that contains a media access control (MAC) protocol data unit (MPDU) in response to the request frame without receiving a separate acknowledgement (ACK) frame acknowledging receipt of the request frame, wherein the sounding PPDU includes a request identity field that indicates the request identity number included in the request frame.

2. The method of claim 1 wherein the sounding PPDU is received within a short inter-frame spacing (SIFS) of the request frame.

3. The method of claim 1 wherein the sounding PPDU is piggybacked on another frame.

4. The method of claim 1 wherein the sounding PPDU is aggregated with another frame.

5. The method of claim 1 wherein the request frame includes an ACK policy field that indicates whether to acknowledge receipt of the request frame with a separate ACK frame, whereby the sounding PPDU is received without receiving the separate ACK frame on a condition that the ACK policy field indicates that the separate ACK frame will not be received.

6. The method of claim 1 wherein the request frame includes a response time policy field to indicate whether the sounding PPDU is to be received immediately or within a predetermined time period.

7. The method of claim 1 wherein the request frame includes an aggregation policy field to indicate whether the sounding PPDU may be aggregated with at least one other frame.

8. The method of claim 7 wherein the aggregation policy field indicates that multiple packets should be received in a reduced inter-frame spacing (RIFS).

9. The method of claim 1 wherein the request frame and the sounding PPDU are management frames.

10. The method of claim 1 wherein the sounding PPDU is used for at least one of transmit beam forming, calibration, and antenna selection.

11. The method of claim 1 wherein the request frame includes a modulation and coding scheme (MCS) request and the sounding PPDU includes an MCS feedback, and wherein the method further comprises generating a next frame based on the MCS feedback.

12. A station (STA) comprising:
a transmitter configured to transmit a request frame to a responder, wherein the request frame includes a request identity number field that indicates a request identity number; and
a receiver configured to receive, from the responder, a sounding physical layer protocol data unit (PPDU) that contains a media access control (MAC) protocol data unit (MPDU) in response to the request frame without receiving a separate acknowledgement (ACK) frame acknowledging receipt of the request frame, wherein the sounding PPDU includes a request identity field that indicates the request identity number included in the request frame.

13. The STA of claim 12 wherein the receiver is configured to receive the sounding PPDU within a short inter-frame spacing (SIFS) of the request frame.

14. The STA of claim 12 wherein the receiver is configured to receive the sounding PPDU piggybacked on another frame.

15. The STA of claim 12 wherein the receiver is configured to receive the sounding PPDU aggregated with another frame.

16. The STA of claim 12 wherein the transmitter is configured to transmit the request frame including an ACK policy field that indicates whether to acknowledge receipt of the request frame with a separate ACK frame, whereby the receiver is configured to receive the sounding PPDU without receiving the separate ACK frame on a condition that the ACK policy field indicates that the separate ACK frame will not be received.

17. The STA of claim 12 wherein the transmitter is configured to transmit the request frame including a response time policy field to indicate whether the sounding PPDU is to be received immediately or within a predetermined time period.

18. The STA of claim 12 wherein the transmitter is configured to transmit the request frame including an aggregation policy field that indicates whether the sounding PPDU may be aggregated with another frame.

19. The STA of claim 18 wherein the aggregation policy field indicates that the STA should receive multiple packets in a reduced inter-frame spacing (RIFS).

20. The STA of claim 12 wherein the request frame and the sounding PPDU are management frames.

21. The STA of claim 12 further comprising:
a processor configured to use the sounding PPDU for at least one of transmit beam forming, calibration, and antenna selection.

22. The STA of claim 12 wherein the transmitter is configured to transmit the request frame including a modulation and coding scheme (MCS) request and the receiver is configured to receive the sounding PPDU including an MCS feedback; and wherein the transmitter is configured to transmit a next frame based on the MCS feedback.

23. A method for use in a station (STA), the method comprising:
receiving, from an initiator, a request frame, wherein the request frame includes a request identity number field that indicates a request identity number; and
transmitting, to the initiator, a sounding physical layer protocol data unit (PPDU) that contains a media access control (MAC) protocol data unit (MPDU) in response to the request frame without transmitting a separate acknowledgement (ACK) frame acknowledging receipt of the request frame, wherein the sounding PPDU includes a request identity field that indicates the request identity number included in the request frame.

24. The method of claim 23 wherein the sounding PPDU is transmitted within a short inter-frame spacing (SIFS) of the request frame.

25. The method of claim 23 wherein the sounding PPDU is piggybacked on another frame.

26. The method of claim 23 wherein the sounding PPDU is aggregated with another frame.

27. The method of claim 23 wherein the sounding PPDU is transmitted without transmitting a separate ACK frame by default.

28. The method of claim 23 wherein the request frame includes an ACK policy field that indicates whether to transmit a separate ACK frame to acknowledge receipt of the request frame, whereby the sounding PPDU is transmitted without transmitting a separate ACK frame on a condition that it is indicated by the ACK policy field.

29. The method of claim 23 wherein the request frame includes a response time policy field that indicates whether the sounding PPDU should be transmitted immediately or within a predetermined time period.

30. The method of claim 23 wherein the request frame includes an aggregation policy field that indicates whether the sounding PPDU may be aggregated with at least one another frame.

31. The method of claim 30 wherein the aggregation policy field indicates that multiple packets should be transmitted in a reduced inter-frame spacing (RIFS).

32. The method of claim 23 wherein the request frame and the sounding PPDU are management frames.

33. The method of claim 23 wherein the sounding PPDU is used for at least one of transmit beam forming, calibration, and antenna selection.

34. The method of claim 23 wherein the request frame includes a modulation and coding scheme (MCS) request and the sounding PPDU includes an MCS feedback, whereby a next frame is received based on the MCS feedback.

35. A station (STA) comprising:
- a receiver configured to receive a request frame from an initiator, wherein the request frame includes a request identity number field that indicates a request identity number; and
- a transmitter configured to transmit, to the initiator, a sounding physical layer protocol data unit (PPDU) that contains a media access control (MAC) protocol data unit (MPDU) in response to the request frame without receiving a separate acknowledgement (ACK) frame acknowledging receipt of the request frame, wherein the sounding PPDU includes a request identity field that indicates the request identity number included in the request frame.

36. The STA of claim 35 wherein the transmitter is configured to transmit the sounding PPDU within a short inter-frame spacing (SIFS) of the request frame.

37. The STA of claim 35 wherein the transmitter is configured to transmit the sounding PPDU piggybacked on another frame.

38. The STA of claim 35 wherein the transmitter is configured to transmit the sounding PPDU aggregated with another frame.

39. The STA of claim 35 wherein the transmitter is configured to transmit the sounding PPDU without transmitting the separate acknowledgement (ACK) frame by default.

40. The STA of claim 35 wherein the receiver is configured to receive the request frame including an ACK policy field that indicates whether to acknowledge receipt of the request frame with a separate ACK frame, whereby the sounding PPDU transmitted without transmitting the separate ACK frame on a condition that the ACK policy field indicates that no separate ACK frame should be transmitted.

41. The STA of claim 35 wherein the receiver is configured to receive the request frame including a response time policy field to indicate whether the transmitter should transmit the sounding PPDU immediately or within a predetermined time period.

42. The STA of claim 35 wherein the receiver is configured to receive the request frame including an aggregation policy field that indicates whether the STA may aggregate the sounding PPDU with another frame.

43. The STA of claim 42 wherein the aggregation policy field indicates that multiple packets should be transmitted in a reduced inter-frame spacing (RIFS).

44. The STA of claim 35 wherein the receiver is configured to receive the request frame as a management frame and the transmitter is configured to transmit the sounding PPDU as a management frame.

45. The STA of claim 35, wherein the sounding PPDU is used for at least one of transmit beam forming, calibration, and antenna selection.

46. The STA of claim 35 wherein the receiver is configured to receive the request frame including a modulation and coding scheme (MCS) request and the transmitter is configured to transmit the sounding PPDU including an MCS feedback.

* * * * *